US006663778B1

United States Patent
Bader

(12) United States Patent
(10) Patent No.: US 6,663,778 B1
(45) Date of Patent: *Dec. 16, 2003

(54) PROCESS FOR THE TREATMENT OF AQUEOUS STREAMS CONTAINING INORGANICS

(76) Inventor: Mansour S. Bader, P.O. Box 10675, College Station, TX (US) 77842

( * ) Notice: Subject to any disclaimer, the term of this patent is extended or adjusted under 35 U.S.C. 154(b) by 0 days.

This patent is subject to a terminal disclaimer.

(21) Appl. No.: 10/094,562

(22) Filed: Mar. 8, 2002

Related U.S. Application Data

(63) Continuation-in-part of application No. 09/416,320, filed on Oct. 12, 1999, now Pat. No. 6,365,051.

(51) Int. Cl.[7] .............................. B01D 61/36; C02F 1/54
(52) U.S. Cl. ........................ 210/640; 210/641; 210/729; 210/806; 210/912
(58) Field of Search ................................. 210/650, 651, 210/652, 640, 641, 729, 806, 912, 747; 203/47, 48, 12, 91; 423/12; 166/75.12

(56) References Cited

U.S. PATENT DOCUMENTS 4,366,063 A * 12/1982 O'Connor .................. 210/652
6,372,143 B1 * 4/2002 Bradley ..................... 210/638

* cited by examiner

Primary Examiner—W. L. Walker
Assistant Examiner—K S Menon
(74) Attorney, Agent, or Firm—Fellers, Snider, Blankenship, Bailey & Tippens, P.C.

(57) ABSTRACT

Disclosed is a method of separating sulfate-ion pair complexes from aqueous streams. The method involves the steps of: (a) concentrating and distilling an aqueous stream containing inorganic material by membrane distillation; (b) adding a non-hazardous miscible organic solvent to the concentrated aqueous stream in an amount effective to form inorganic precipitates comprising at least a portion of sulfate and polyvalent cations; (c) removing at least most of the organic solvent from the aqueous stream by vacuum membrane distillation; and (d) after step (c), removing at least most of the inorganic precipitates from the aqueous stream.

11 Claims, 7 Drawing Sheets

PROCESS FOR THE TREATMENT OF AQUEOUS STREAMS CONTAINING INORGANICS

This application is a continuation-in-part of application Ser. No. 09/416,320 file Oct. 12, 1999 now U.S. Pat. No. 6,365,051.

BACKGROUND OF THE INVENTION

Formation waters are often produced concurrently with oil and/or gas. Higher amounts of produced waters occur during the middle or later stage of the primary production after water breakthrough. A further increase in the amounts of such waters also occurs during the secondary treatment, in which large amounts of waters are injected from the surface into the reservoir formation to sustain oil and/or gas production. In some cases, the amounts of produced waters could reach 90% or more of the total fluids produced.

Chloride is the dominant anion in most produced waters, with the exception of a few cases where sulfate and bicarbonate exceed chloride by weight. Chloride-rich produced waters that are high in calcium (in larger portions than in seawater) are generally high in alkaline cations such as strontium, barium, and in some cases radium. The availability of radium in produced waters suggests that the decay chain of radium, referred to as Naturally Occurring Radioactive Materials (NORM), are common and thus such waters can become radioactive.

Factors such as: (1) changes in pressure or temperature or pH or combinations of these parameters; (2) variations in flow rates, impurities, additives, fluid expansion, and gas evaporation; and (3) mixing of incompatible waters cause scale formation (mainly strontium and barium in the form of sulfate). However, the mixing of incompatible waters is the primary reason for scale formation. The formation of scale salts can lead to production problems in primary oil wells, secondary oil wells, injection wells, disposal wells, pipelines, and process equipment. In addition, external radiation (near any processing equipment) and internal radioactive hazards (during maintenance or workover) could exist due to NORM buildup during processing, referred to as Technologically Enhanced Naturally Occurring Radioactive Materials (TENORM).

In offshore oil and gas reservoirs (e.g., Gulf of Mexico, North Sea, etc.), pressure maintenance with water injection is required over the reservoir life to maintain oil and/or gas production. The salinity of seawater is to a large extent compatible with the salinity of produced waters in most reservoirs. Table 1 presents the concentrations of inorganics in seawater and samples of produced waters (Hardy, J. A. and Simm, I., "Low Sulfate Seawater Mitigates Barite Scale" Oil & Gas J. (1996) Dec. 9: 64–67). Barium and strontium in produced waters are typically in the form of chloride. However, direct injection of seawater, with about 2,700 ppm of sulfate ion, would react with barium and strontium in the reservoirs, to form sulfate scales. This would lead to flow problems and subsequent plugging in producing wells as well as possible formation of a significant radioactive scale. In spite of a large number of proprietary chemicals in blends available as scale inhibitors and dissolvers, scale prevention with such chemicals has proved difficult, very expensive, and of limited value for solving the scale problem or protecting the reservoir formation matrix. Injection of potable water (although it's an expensive option in offshore fields) could damage the formation by causing clays in the reservoir matrix to swell and block pores (incompatible salinity). Nearly-sulfate free seawater would be acceptable for injection into offshore and some onshore reservoirs. This would also prevent the reservoir from souring (due to sulfate conversion to hydrogen sulfide via thermophilic sulfate reducing bacteria). However, the nearly-sulfate free seawater substantially minimizes but not entirely eliminates scale formation (due to the very low aqueous solubilities of barium and strontium sulfate).

Another example of incompatible waters is the mixing of produced waters from different production zones. It is not uncommon that the chemistry of produced waters differs considerably from zone to zone within the same processing facilities. The mixing of incompatible waters causes almost immediate scale build-up, which leads to expensive problems (e.g., stuck downhole pumps, plugged perforations and tubing strings, choked flowlines, frozen valves, equipment damage, and downtime during maintenance).

A further example of mixing incompatible waters is that nearly all onshore oil-field produced waters are injected into subsurface formation through injection wells. In addition to the possible formation of scale and NORM hazards, two further problems are of major concern. The first problem is the seepage of the disposed produced waters to contaminate (mainly salinity and possibly radioactivity) sources of potable waters such as near by rivers, lakes, and shallow groundwater. The second problem is the incompatibility between the injected produced waters and the existed formation water in the disposal wells that could lead to destroy the injectivity by plugging the pores of the permeable zone in the disposal wells.

These two problems can be illustrated in the natural brine seepage into the Dolores River in Paradox Valley (Colorado), which increases the dissolved solids of the Colorado River annually by about 200 million kilograms. The Colorado River is a major source of water for both the United States and the Republic of Mexico. To solve this problem, about 3540 cubic meters per day of brine needs to be pumped from shallow brine wells (TDS: 250,000 ppm) located along the Dolores River into a very deep injection well (Mississippian Leadville Limestone). This volume of continuous pumping is needed to create a cone of depression in the brine field near the river that should fill with freshwater and stop brine seepage. Table 2 presents the concentrations of inorganic species from several brine wells and the injection well (Kharaka, Y. K., et al., "Deep Well Injection from Paradox Valley, Colo.: Potential Major Precipitation Problems Remediated by Nanofiltration", Water Resour. Res. (1997) 33: 1013–1020). The injection of such brine waters into the formation water of the injection well clearly will lead to the formation of a huge mass of calcium sulfate in conjunction with barium and strontium sulfate at downhole. This would plug the permeable zone of the injection well.

The pressure-driven nanofiltration (NF) membrane process is a potential technology for solving such sulfate scale problems. NF organic membranes are capable of efficiently rejecting divalent ions while retaining monovalent ions. FIG. 1 depicts the rejection of magnesium sulfate and sodium chloride by NF (Davis, R., et al., "Membranes Solve North Sea Waterflood Sulfate Problems" Oil & Gas J. (1996) Nov. 25: 59–64). The rejection of sulfate is constantly very high (about 98%) regardless of the operating pressures, while the rejection of chloride is relatively low and increases with the increase of the operating pressures. However, several problems are associated with the use of NF.

First, extensive pretreatment is essential for reliable NF system, particularly in the case of treating seawater. Chemical coagulation (polyelectrolyte) and pre-filtration are needed to coagulate suspended particles to sufficient sizes so that they can be removed via filtration. Bacteria remediation (adding sodium hypochlorite or free chlorine to seawater) is also needed to prevent bacteria growth (plugs the pores of the organic membrane) and subsequent biofilm formation resulting in biological membrane fouling. This would, in turn, require: (1) the addition of sodium metabisulfate to remove the added chlorine, and thus to prevent it from oxidizing the membrane; and (2) placement of a de-oxygenation or a de-aerator system (to reduce oxygen content).

Second, NF membranes recover at best 75% of the feed stream. The remaining 25% (concentrate stream) represents one-fourth of the feed stream and thus contains roughly four-times the initial concentrations of the feed species. For instance, the high rejection of 2,700 ppm of sulfate (about 98%) from seawater roughly translates to 11,000 ppm in the concentrate stream. About one-third of calcium is simultaneously rejected with sulfate. The combined increase in the rejected amounts of sulfate and calcium leads to the precipitation of calcium sulfate (aqueous solubility is about 2,400 ppm at 25° C.) on the concentrate side of the membrane, and causes membrane fouling. As such, anti-scale chemicals are constantly needed to retard the formation of calcium sulfate and protect the membrane. Other scale foulants such as calcium carbonate, iron sulfide, or combinations are also of concern.

Third, the remaining 25% of the concentrate stream in the NF process represents a large secondary waste stream. The disposal of such a highly concentrated waste stream with scale/radioactive foulants is an additional critical problem. This demonstrates that the high removal (more than is necessary) of sulfate by NF and without operational controls is not always advantageous.

Fourth, membrane throughput (permeate flux) depends on the concentration of inorganics in the feed solution as well as the temperature of the feed solution. As shown in Tables 1 and 2, the osmotic pressure ($\pi$) of seawater is about 410 psia while osmotic pressures of the reported produced waters are extremely high due to high levels of sodium chloride. Although a portion of sodium chloride passes through the NF membrane under moderate throughput operation (FIG. 1), higher operating pressures are required to achieve acceptable permeate throughput. This would increase the rejection of sodium chloride, which, in turn, would increase the osmotic pressure of the solution across the membrane. In addition, low feed temperatures increase the viscosity of water, and thus higher operating pressures (3 to 4.8% increase per 1° C.) are required to diffuse water through the membrane. For instance, the temperature of the North Sea is less than 15° C., which requires an operating pressure of 600 psia (about the structural pressure limits of most NF modules). As such, operating the NF process at relatively low permeate throughput, and/or increasing feed water temperature are respectively the two costly options in treating aqueous streams containing high levels of chloride salts, or operating in a cold climate.

Therefore, what is needed is an effective method that would selectively remove scale/NORM salts from seawater, oil-field produced waters, brine waters, and the like. As such, this invention is directed first to provide a highly selective method for separating sulfate and polyvalent cations (calcium, strontium, barium, radium and it's decay chain, and others) from such aqueous streams, and second to implement a cost-effective proactive method to prevent scale/NORM formation rather than allowing it to be formed, and then coping with the costs of dissolution and disposal of the formed scale/NORM.

In the case of injecting seawater into reservoirs to maintain pressure, downhole scale formation occurs after the injection of the treated seawater breaks through at a producing well where barium-strontium containing produced waters are co-interacted with remaining sulfate in the treated seawater. A better solution to this problem is to: (1) treat at least a portion of oil-field produced water by selectively removing barium, strontium, and radium (if it exists); (2) treat seawater by selectively separating sulfate; (3) blend the treated oil-field produced water with the treated seawater to produce scale-free saline water; and (4) inject the scale-free saline water into reservoirs formation as a pressure support to maintain oil and gas production. The production rate of oil-field produced water, the concentration profile of alkaline cations in such water, and the needed amount of scale-free saline water for pressure support determine the extent and the proportions of oil-field produced water and seawater that need to be treated.

Several vital concerns would be resolved. First, blend scale-free saline water is more compatible with the reservoir formation than sulfate-free seawater. Second, scale formation can be monitored before injection into reservoirs, an effective and preventive measure to protect the reservoir formation (minimizes, if not eliminates, the costly scale inhibitors treatment). Third, provide a readily available source of scale-free saline water for use in routine well-service operations. Fourth, protect the sea aquatic life from direct discharging of produced waters (e.g., radioactivity of NORM; salinity reaches in some cases 200,000 ppm; temperatures reach in some cases 100° C.; and depleted of dissolved oxygen). Fifth, potential cost (capital and operating) savings.

This approach can be equally applied to other cases of mixing incompatible waters such as the processing of oil-field produced waters from different production zones (different chemistry) in the same oil and gas production facilities, or the disposing of formation waters in deep injection wells.

SUMMARY OF THE INVENTION

In one aspect, the present invention provides a method of producing petroleum, gas, or other products from a subterranean formation using seawater. The inventive method comprises the steps of: (a) removing natural sulfate from the seawater; and (b) injecting the resulting treated seawater product into the subterranean formation. Natural sulfate is removed from the seawater in step (a) by (i) concentrating calcium sulfate in seawater to near saturation by membrane distillation; (ii) adding an organic solvent to the seawater in an amount effective to form a precipitate comprising the sulfate; (iii) removing at least most of the organic solvent from the aqueous stream by vacuum membrane distillation; and (iv) removing the precipitate from seawater to produce the treated seawater product. The organic solvent employed in the inventive method is preferably isopropylamine, ethylamine, or a combination thereof In another aspect, the present invention provides a method of producing petroleum, gas, or other products from a subterranean formation using formation-produced water. The inventive method comprises the steps of: (a) removing natural, inorganic material from the formation-produced water; and (b) injecting the resulting treated water product into the subterranean formation. In step (a), the natural, inorganic material is removed from the formation-produced water by (i) adding organic solvent to the formation-produced water in an amount effective to form a precipitate comprising the inorganic material; (ii) removing at least most of the organic solvent from the aqueous stream by vacuum membrane distillation; and (iii) removing the precipitate from the formation-produced water to yield the treated water product. The organic solvent employed in the inventive method is preferably isopropylamine, ethylamine, or a combination thereof. The natural inorganic material contained in the formation-produced water will typically comprise at least one of sulfate, calcium, barium, strontium, radium, Naturally Occurring Radioactive Material, silica and silicate.

In another aspect, the present invention provides a method of producing petroleum, gas, or other products from a subterranean formation using seawater and/or formation-produced water. The inventive method comprises the steps of: (a) removing natural sulfate from the seawater (or other formation-brine water); (b) removing natural inorganic material from the formation-produced water; (c) blending the treated water in steps (a) and (b) to produce scale-free saline water; and (d) injecting the resulting scale-free saline water product from step (c) into the subterranean formation. In step (a), the natural sulfate is removed from the seawater by (i) concentrating calcium sulfate in seawater to near saturation by membrane distillation; (ii) adding an organic solvent to the seawater in an amount effective to form a precipitate comprising the sulfate; (iii) removing at least most of the organic solvent from the aqueous stream by vacuum membrane distillation; and (iv) removing the precipitate from seawater to produce the treated seawater product. In step (b), the natural inorganic material are removed from the formation-produced water by (i) adding an organic solvent to the formation-produced water in an amount effective to form a precipitate comprising the natural sulfate and inorganic material; (ii) removing at least most of the organic solvent from the aqueous stream by vacuum membrane distillation; and (iii) removing the precipitate from the treated water to yield scale-free saline water product. The organic solvent employed in the inventive method is preferably isopropylamine, ethylamine, or a combination thereof. The natural inorganic material contained in the seawater and formation-produced water will typically comprise at least one of sulfate, calcium, barium, strontium, radium, Naturally Occurring Radioactive Material, silica and silicate.

In yet another aspect, the present invention provides a method of treating an aqueous stream having inorganic material dissolved therein, the inventive method comprising the steps of: (a) distilling the aqueous stream by membrane distillation to produce an aqueous permeate product and an intermediate concentrate comprising at least most of the inorganic material; (b) adding an organic solvent to the intermediate concentrate in an amount effective to form a precipitate comprising at least a portion of the inorganic material; (c) removing at least most of the organic solvent from the intermediate concentrate by vacuum membrane distillation; and (d) removing at least most of the precipitate from the intermediate concentrate to produce a concentrate product and an at least partially purified aqueous product. The organic solvent employed in the inventive method is preferably isopropylamine, ethylamine, or a combination thereof. The inorganic material removed by the inventive method will typically comprise at least one of aluminum, titanium, vanadium, chromium, manganese, iron, cobalt, nickel, cadmium, zinc, zirconium, cerium, praseodymium, neodymium, promethium, samarium, europium, gadolinium, terbium, dysprosium, holmium, erbium, thulium, ytterbium, lutetium, thorium, uranium, silicate and silica.

Further objects, features, and advantages of the present invention will be apparent to those skilled in the art upon examining the accompanying drawings and upon reading the following description of the preferred embodiments.

DESCRIPTION OF THE PREFERRED EMBODIMENT

The selection of an organic solvent is the most significant aspect in the precipitation process. The suitable solvents are those which have the capability to meet two basic criteria: (1) suitability to precipitate targeted inorganic species from aqueous solutions; and (2) suitability for overall process design. The selected organic solvent must be miscible with the aqueous phase. Of equal importance, targeted inorganic salts must be sparingly soluble (preferably insoluble) in the organic solvent. The addition of such a solvent to an inorganics-aqueous solution leads to capture of part of the water molecules and reduces the solubility of inorganics in water which forms insoluble precipitates. The ionic charge and radius, and the presence of a "suitable anion" in a targeted inorganic-aqueous mixture plays an important role in affecting and characterizing the precipitation step. The role of such an "anion" can be seen in controlling the rate of change in the pH values, and in forming a basic salt, preferably with limited aqueous solubility, which by precipitation, reduces the cation concentration.

For ease of recovery, the selected solvent must have favorable physical properties such as low boiling point, high vapor pressure, high relative volatility, and no azeotrope formation with water. From a process design standpoint, the selected organic solvent must have low toxicity since traces always remain in the discharge stream. The solvent vapors are also of prime concerns. Further, the selected solvent must be chemically stable, compatible with the process, and relatively inexpensive. Several solvents have been identified for use in the precipitation step including isopropylamine (IPA), ethylamine (EA), propylamine (PA), diisopropylamine (DIPA), diethylamine (DEA), and dimethylamine (DMA). However, IPA is the preferred solvent. The preference of IPA is attributed to its high precipitation ability with different inorganics, favorable properties (boiling point: 32.4° C.; vapor pressure: 478 mmHg at 20° C.); and minimal environmental risks (IPA salts have been used as herbicides for agricultural purposes).

Thermodynamics equilibrium calculations indicated that IPA can nearly completely be recovered from aqueous solutions. This is confirmed experimentally. A substantial recovery of IPA (97.8 to 99.9%) from a saline stream was achieved compared to a moderate recovery from a de-ionized water (IPA: 48.3 to 94.4%) using a vacuum system. The significant presence of inorganics in the saline stream has appreciable positive effects on the relative volatility of IPA, which enhances its separation from the aqueous phase.

As such, vacuum membrane distillation (VMD) as a vapor-liquid equilibrium-based process would make direct contribution to the recovery of precipitation solvents with favorable relative volatility such as IPA from aqueous streams.

Figure 1:
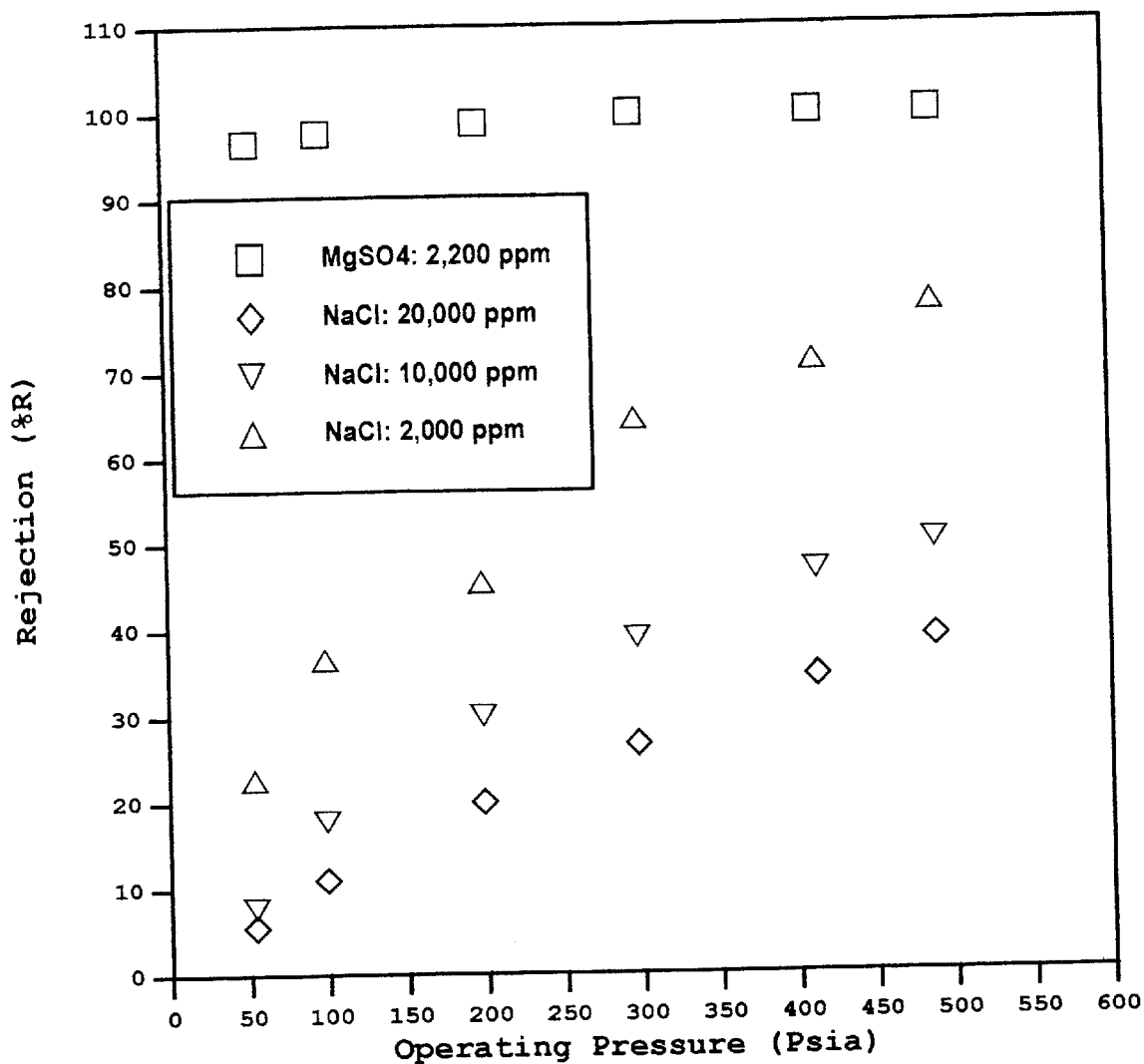
FIG. 1 illustrates the rejection of sodium chloride and magnesium sulfate by NF.
Figure 2:
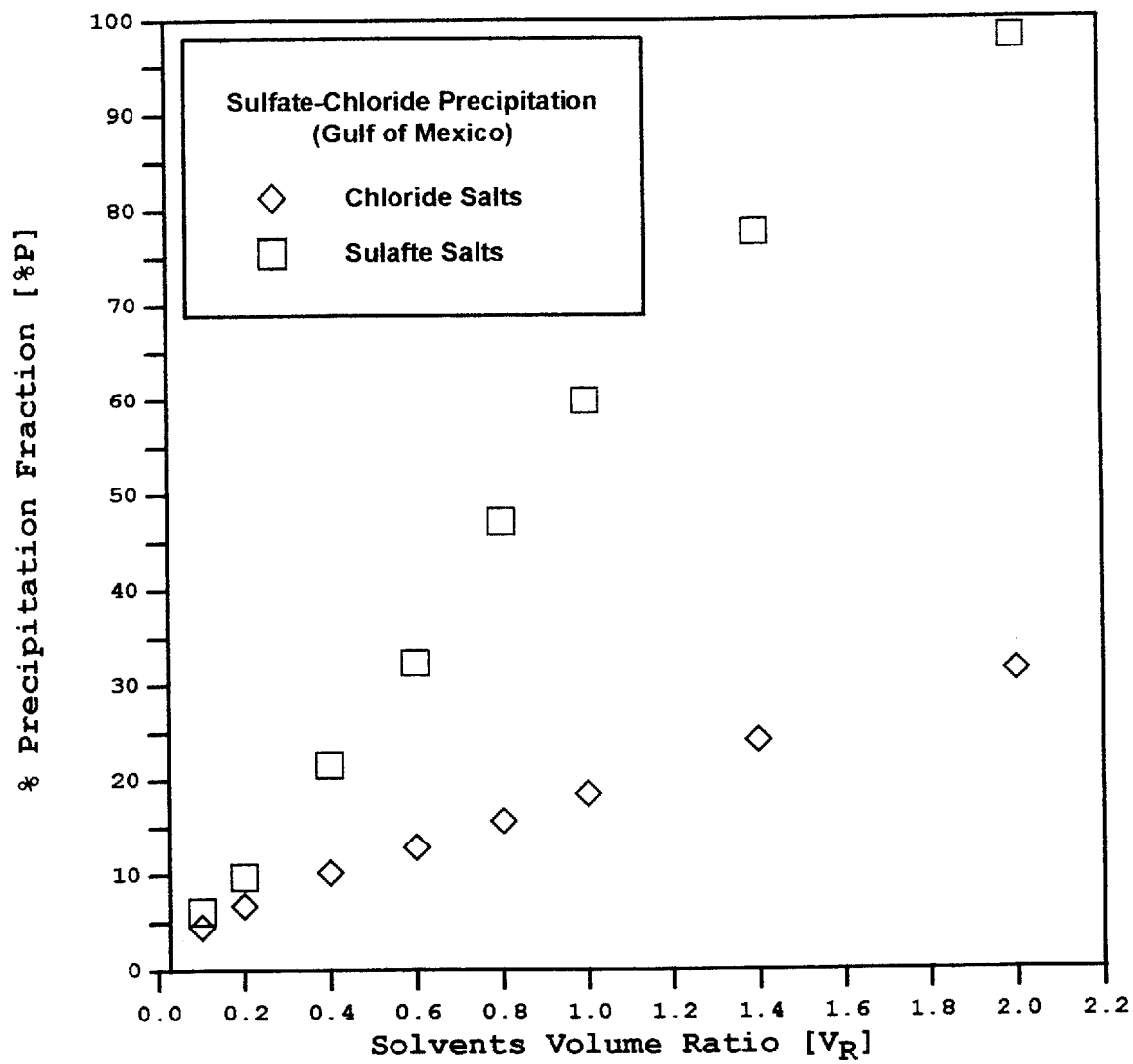
FIG. 2 illustrates the precipitation phase diagram of sulfate and chloride ions from seawater using isopropylamine (IPA) as a precipitation solvent.

The precipitation process can be evaluated in terms of the precipitation fraction (P) as a function of the solvents volume ratio ($V_R$), that is the ratio of the organic solvent volume to the aqueous volume. The P of sulfate and chloride salts from seawater (Gulf of Mexico) using IPA as a precipitation solvent is shown in FIG. 2. The P values of the sulfate salts are significantly higher than the P values of chloride salts, particularly at higher values of $V_R$. About one-third of sulfate in seawater is in the form of calcium, while the remaining two-thirds of sulfate is in the form magnesium (roughly about one-third of magnesium is in the form of sulfate, and the remaining magnesium is in the form of chloride). It is known that the aqueous solubility of sparingly soluble salts such as calcium sulfate increases in the presence of other cations in the form of sulfate with higher aqueous solubilities, particularly alkaline cations such as magnesium. This would explain the relatively low precipitation of sulfate at lower values of $V_R$ (negatively affected by the dominant presence of magnesium).

The volume ratio of the organic solvent to the aqueous waste stream ($V_R$) is a critical factor that needs to be carefully optimized based on the profile of the aqueous stream (e.g., concentration levels of sulfate and alkaline cations). To efficiently minimize the use of organic solvent, a pre-concentration process is needed to sufficiently raise the concentration level of calcium sulfate in seawater from about 1,400 ppm to a level near the aqueous solubility limit of calcium sulfate in seawater. This can be effectively achieved by using membrane distillation (MD). As such, MD as a pre-concentration step would make direct contributions to the productivity of the precipitation process.

Several advantages of MD compared to conventional pressure-driven membrane (e.g., NF) or evaporation processes can be seen. First, MD can take place at atmospheric or sub-atmospheric pressures, and at temperatures that are significantly lower than the boiling point of water (e.g., 45° C.). Any form of low grade or waste heat (e.g., existing low temperature gradients typically available in processing plants, solar or geothermal energy) can be used. Second, the distillate product from a solution containing non-volatile inorganics such as seawater is ultra-pure (which is not of concern in this application), and thus entrainment of dissolved inorganic species in the product stream, as is the case with pressure-driven membrane, is avoided. As such, calcium sulfate can be easily concentrated from 1,400 ppm to 2,200 ppm (roughly about the aqueous solubility limit of calcium sulfate at 45° C.). Third, evaporation in MD takes place from the warm side of the hydrophobic membrane (concentrate) to the cold side of the membrane (product). Such a warm temperature of the concentrate stream (e.g., 45° C.) can be sufficiently used, in turn, to recover the precipitation solvent (e.g., IPA) by vacuum membrane distillation in later processing stages. Fourth, the evaporation surface of MD can be made similar to the available various pressure-driven membrane modules. Such a modularity of MD allows the addition of processing capacity as needed, flexibility and simplicity not available with conventional evaporation processes. Fifth, inorganic hydrophobic membranes permeable to water vapor (e.g., a thin-film of $ZrO_2$ deposited on a porous $Al_2O_3$ support) can be fabricated and used in MD. This would minimize the need for extensive pretreatment as the case in treating seawater with delicate organic NF membranes. Sixth, design issues such as mist, scaling and corrosion are minimal. Reducing capital and operating costs are hence the advantage of MD over conventional pressure-driven membrane or evaporation processes.

Figure 3:
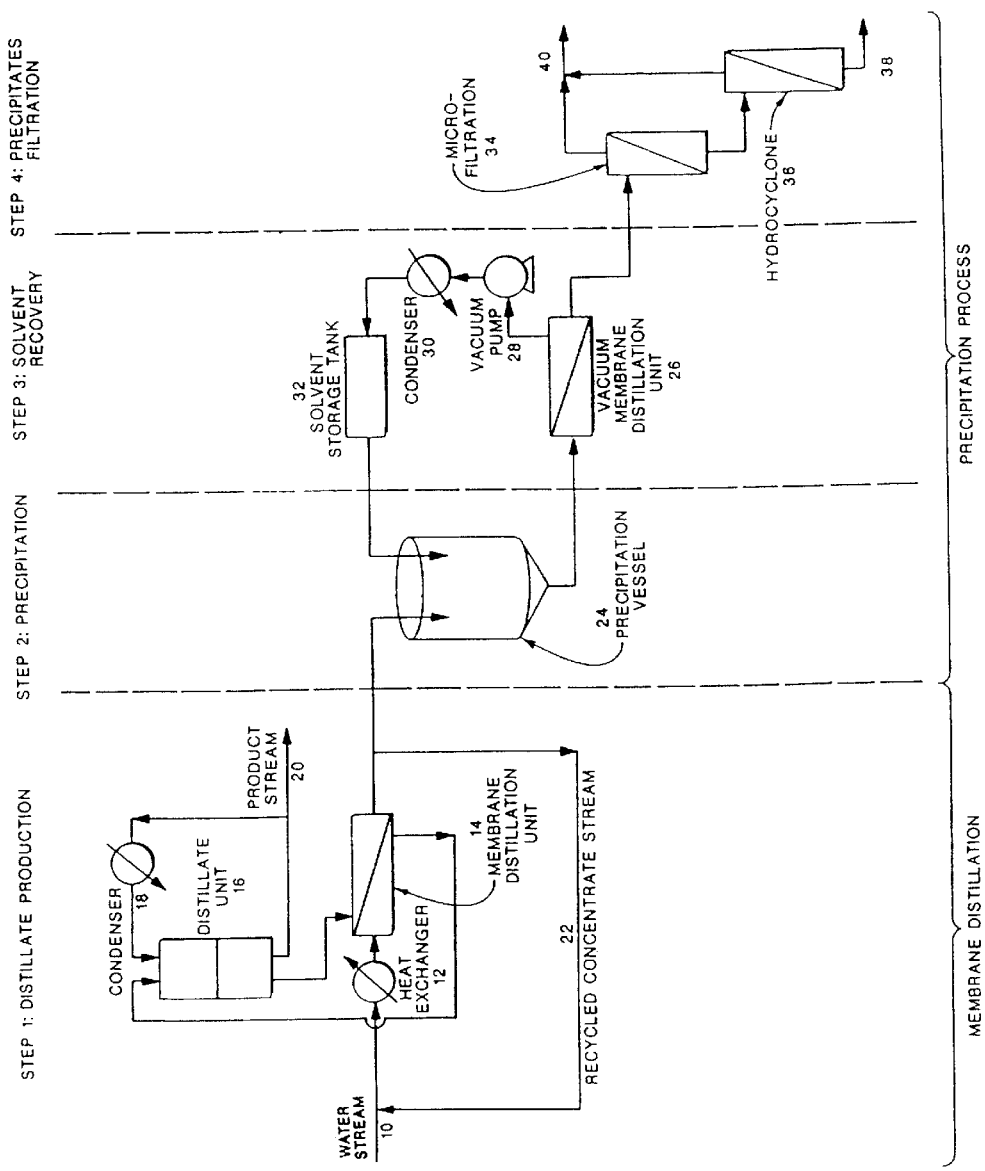
FIG. 3 illustrates a simplified flow sheet for a single-stage membrane distillation-precipitation process.

FIG. 3 depicts a single-stage MD-precipitation process. The MD step [10–22] will serve to concentrate mainly calcium sulfate to near saturation (aqueous solubility limit). The MD concentrate stream [22] will be first recycled, if needed, to the MD feed stream. As the concentration of calcium sulfate reaches near saturation in the MD concentrate stream, the precipitation step [24–40] will then take place. The MD concentrate aqueous stream [22] will be intermixed with an organic solvent in a precipitation vessel [24] to form sulfate precipitates. The stream that will result from the precipitation vessel will be fed into the VMD unit [26] to recover the organic solvent. A vacuum pump [28] will be used to lower the permeate stream pressure below the equilibrium pressure in the feed side of the membrane. The permeate stream that contains the recovered organic solvent will be condensed [30], collected in a storage tank [32], and recycled to the precipitation vessel [24] as needed. Sulfate precipitates will be separated by a combination of microfiltration (MF) (or cross-flow filter) [34] and hydrocyclone (HC) [36] units from the concentrate stream of the VMD unit. The under flow stream (concentrate) of MF [34] which contains dense precipitates (larger than 5 $\mu$m) will, in turn, be delivered to the HC unit [36]. The HC unit will further concentrate precipitates, and will minimize the volume of the under flow stream [38] (less than 2% of the HC feed volume). The over flow streams from the MF and HC units [40] will be used as a treated sulfate-free seawater.

Figure 4:
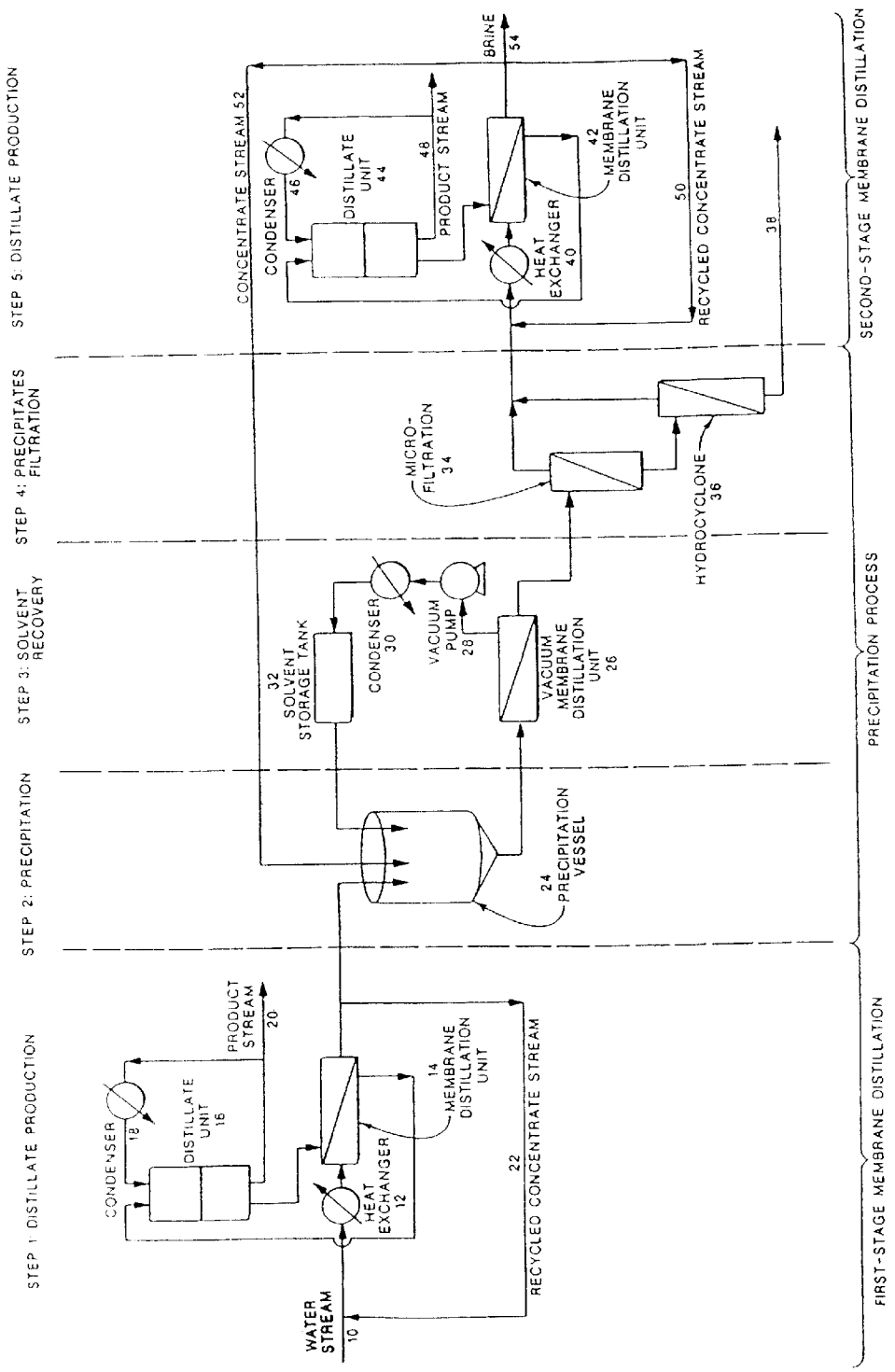
FIG. 4 illustrates a simplified flow sheet for a two-stage membrane distillation and a single-stage precipitation process.
Figure 5:
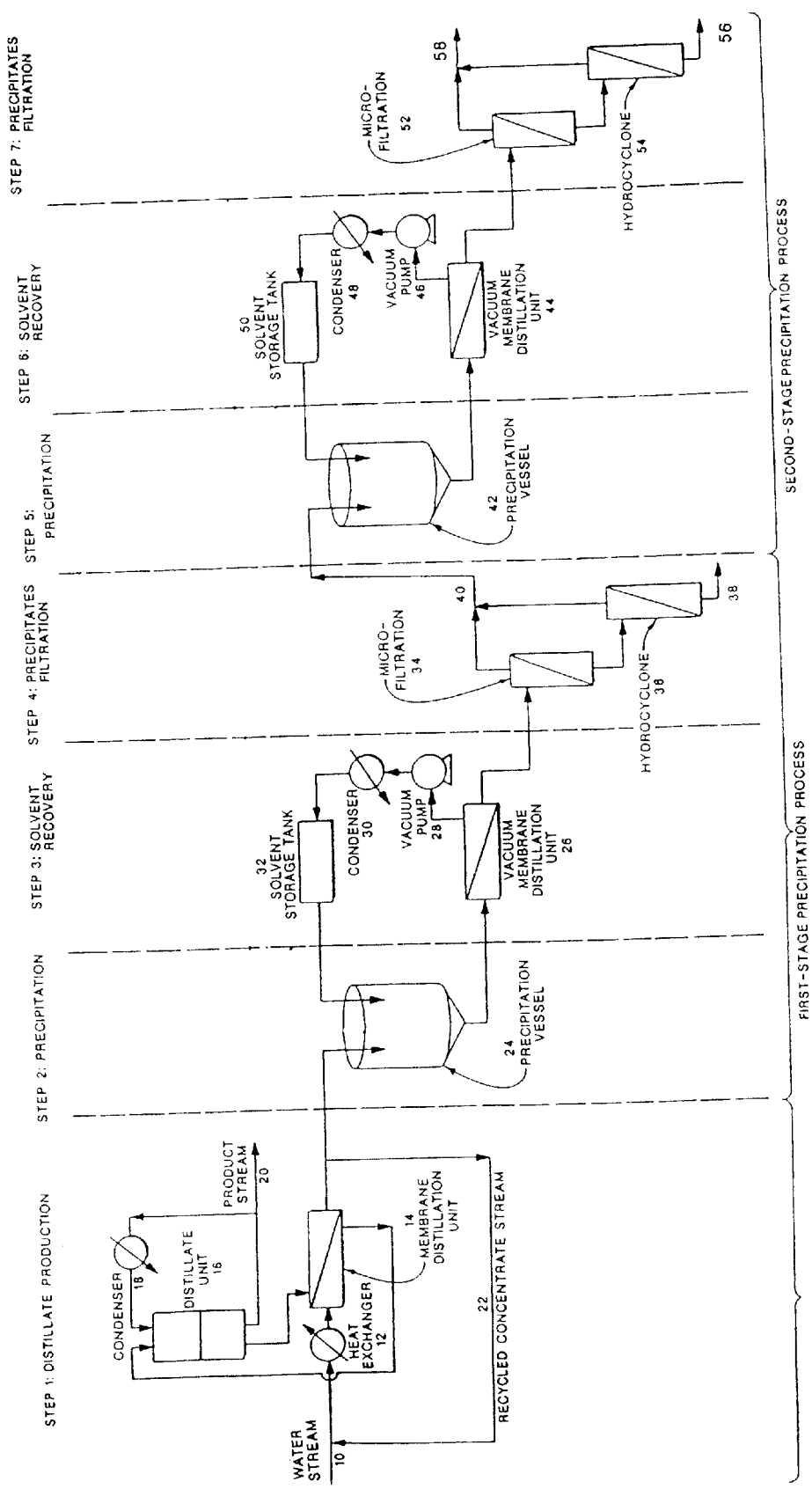
FIG. 5 illustrates a simplified flow sheet for a single-stage membrane distillation and a two-stage precipitation process.

If needed, a second stage MD [40–54] as shown in FIG. 4, or a second-stage precipitation [40–58] as shown in FIG. 5 can be added to optimize and minimize the use of the precipitation solvent. In such cases the overflow of the MF and HC units [40] of the first-stage precipitation will be fed to either a second-stage MD step [42–54] or a second-stage precipitation step [42–58].

Figure 6:
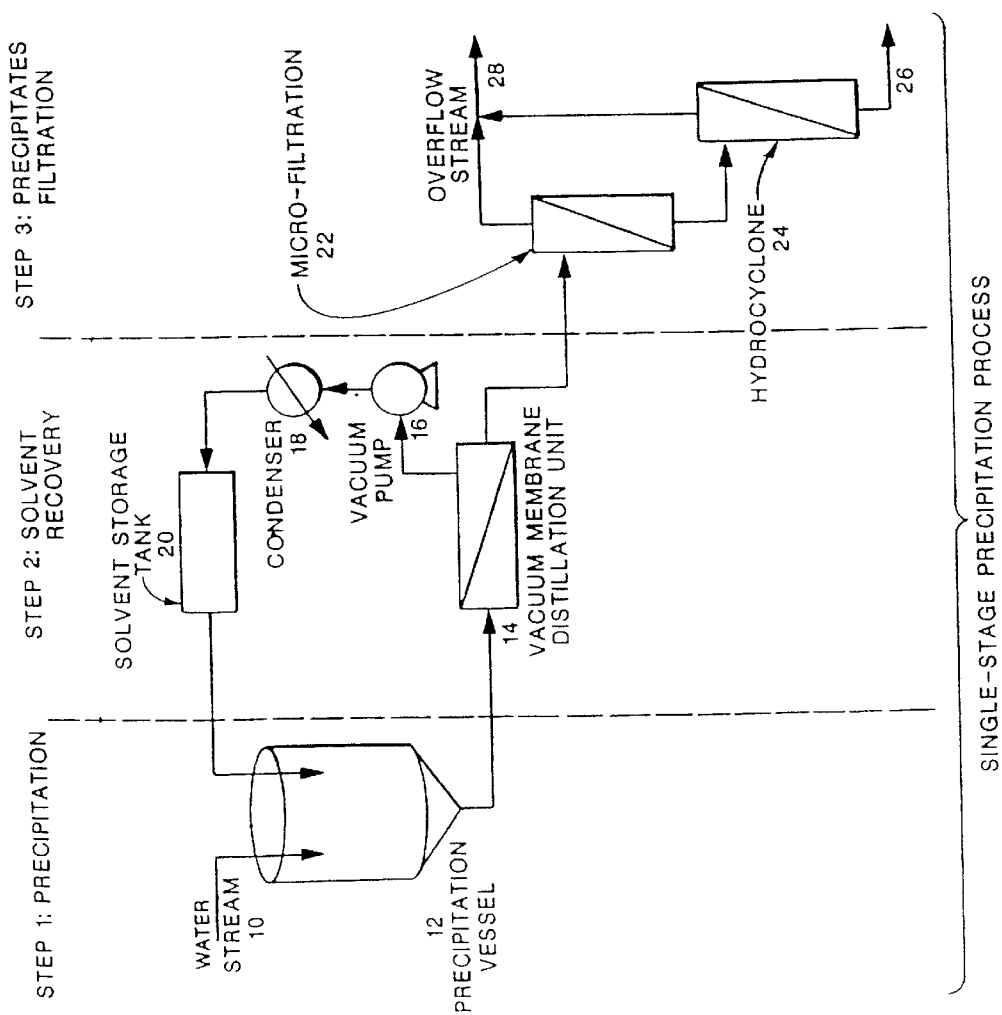
FIG. 6 illustrates a simplified flow sheet for a single-stage precipitation process.
Figure 7:
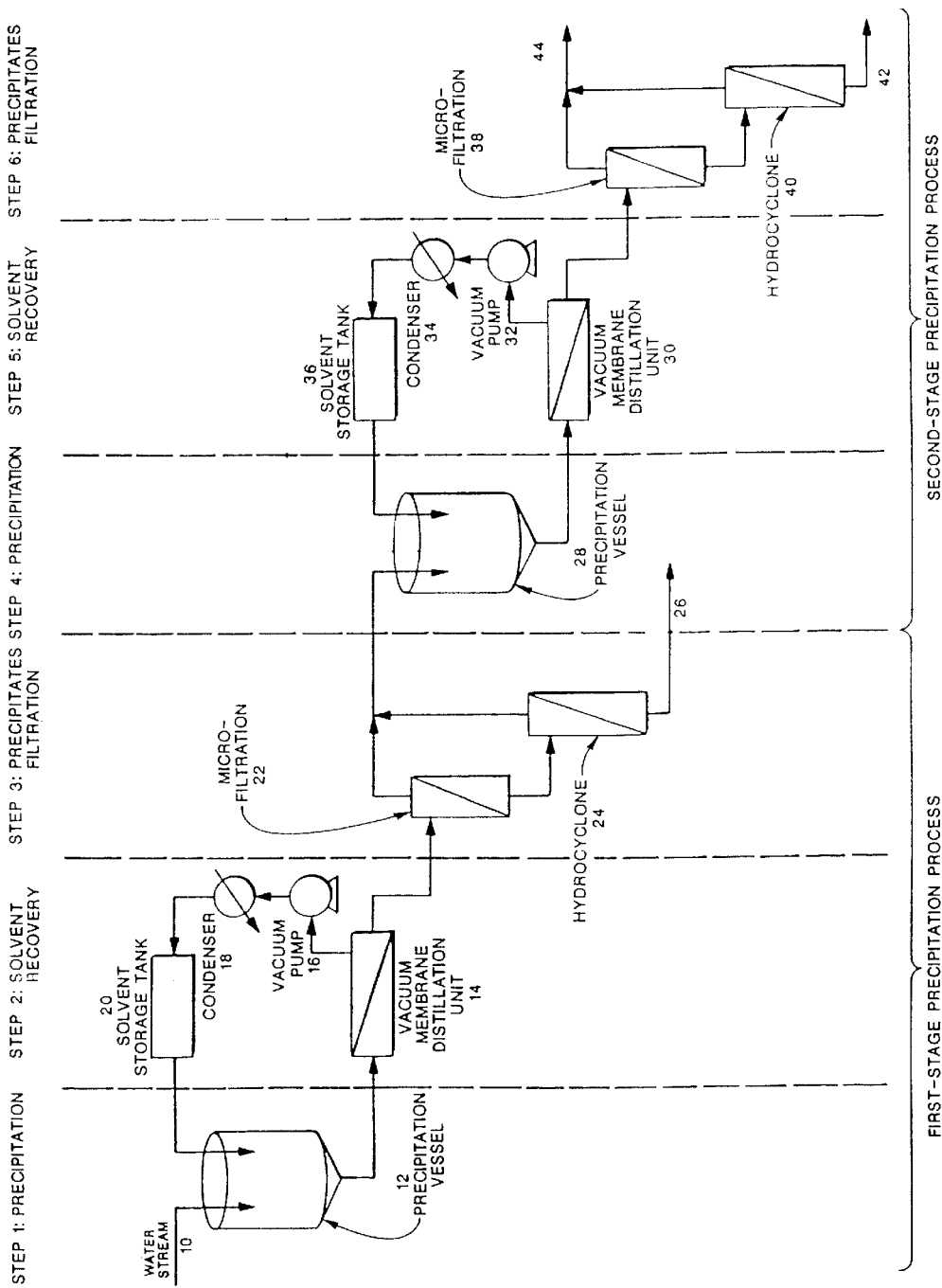
FIG. 7 illustrates a simplified flow sheet for a dual-stage precipitation process.

FIG. 6 illustrates a single-stage precipitation process to treat directly formation-produced water. The aqueous stream [10] will be intermixed with an organic solvent in a precipitation vessel [12] to cause selective inorganic material precipitates. VMD will then be used to recover and recycle the precipitation solvent [14–20]. After that, a filtration-clarification step will be used to remove the formed precipitates [22–28] from the treated stream. FIG. 7 depicts a two-stage precipitation process (or if needed, a multiple-stage) to efficiently minimize the use of the precipitation solvent. In the first stage [10–26], the targeted inorganic material will be partially separated from the aqueous stream. The remaining concentration of the targeted inorganic material will then be precipitated and separated in the second stage [28–44] from the aqueous stream.

OTHER RELATED APPLICATIONS

Acidic drainage from mining sites is the most frequent cause of contaminated ground and surface waters (toxic transition metals, and radioactive rare earth elements), with an estimated 20,000 to 50,000 affected sites nation-wide. The Pinal Creek Basin in Arizona is an example of aqueous streams (ground and surface waters) contaminated by hazardous wastes from historic metal mining practices. Acidic mine drainage over the past century in the Pinal Creek Basin, has resulted from oxidation of sulfide minerals, ore processing, and mining activities in the basin. Contaminant sources were mine tailing ponds, unlined surface water impoundments of mine-process water, heap-leach areas, and occasional spills of contaminated water into stream beds. Unlined impoundments were the largest contaminant sources. Webster lake, for example, was used to store waste from 1940 until 1988, when it was drained by the order of the Environmental Protection Agency (EPA). Available data reveal that from the mid-1970's until the lake was drained in 1988, the pH values of the lake water were between 2 and 3. The concentrations of total dissolved solid (35,000 ppm), sulfate (19,000 ppm), and iron (2,000 ppm) were significantly high.

The Pinal Creek Basin aquifer is composed of two distinct lithologic units. The oldest unit is semi-consolidated to consolidated basin fill with a maximum thickness of more than 1,000 meters. Incised into the basin fill in the major drainages is an unconsolidated alluvium that is less than 50 meters thick, and contains more than 90% sand and gravel. Groundwater in the alluvium (shallow) aquifer and surface flow are severely contaminated with toxic metals. The contaminated groundwater plume in the alluvium aquifer extends 25 kilometers down gradient from the location of mining operations at the head of the basin. Table 3 reveals that toxic transition metals (mainly divalent and polyvalent cations) in the Pinal 20 Creek contaminated water are transported as sulfate-ion pair complexes ("Research on Acidic Metal Contaminants in Pinal Creek Basin near Globe, Ariz.", U.S. Department of Interior/U.S. Geological Survey (1997) Report # SEL US I 19,127: 005-97).

In 1998, the Arizona Department of Environmental Quality (ADEQ) issued an administrative consent order requiring an expedited remedial action by the "Pinal Creek Group" (three mining companies formerly or currently active in the basin mining formed in 1990) to prevent further degradation of water quality. The recommended cleanup strategy by the Pinal Creek Group to the ADEQ is focused on two main objectives. First is to capture additional metal-bearing groundwater before it enters the shallow Pinal Creek aquifer. This requires continuing and expanding contaminates source control and treatment at the mines to reduce the amount of contaminated water leaving the properties. Second, is to capture all metal-bearing groundwater currently in the aquifer before it reaches surface flow downstream. This objective requires: (1) constructing an underground barrier to capture all groundwater before it reaches the surface flow; and then (2) pumping and treating groundwater.

Lime is the suggested method to treat contaminated water. This suggestion is attributed to the chemistry of transition metals in contaminated water. Metals can be conventionally precipitated as metal hydroxides by simply neutralizing the acidic contaminated water. Although lime treatment has been commonly used to remove metals from contaminated water, factors such as the optimum amount of chemicals to be added, variations in pH zones and metals concentrations, mixing requirements, retention-settling-clarifying time requirements, production of large amounts of sludge, sludge characteristics, and sludge disposal can make lime treatment operationally and/or economically ineffective.

As discussed earlier, NF is an efficient process for rejecting divalent ions while retaining monovalent ions. Two main problems, however, are associated with the use of NF for this specific application. The first problem is the high rejection, for instance, of 1,800 ppm of sulfate roughly leads to 7,200 ppm of sulfate in the NF concentrate stream. Divalent and polyvalent cations in the metal-bearing water (Table 3) are all in the form of sulfate. Most, if not all, of calcium will be simultaneously rejected with sulfate. The combined increase in the concentrations of sulfate and calcium would lead to the precipitation of calcium sulfate. Other foulants such as sulfate scales (in the form of iron, manganese, aluminum, and strontium), some carbonate scale (in the form of calcium), and silica are also very critical. Anti-scale chemicals and frequent membrane cleanup will be constantly needed to ineffectively retard scale formation. The second problem is the disposal of the concentrate stream (about 25% of the feed stream).

Two possible treatment approaches to remove toxic metals from the Pinal Creek Basin and other related sites can be implemented. The first approach is to use the precipitation process as illustrated in FIG. 6 or FIG. 7 to effectively treat contaminated water (ground, surface, and mine processing waters) with toxic metals. The process is very suitable for the removal of divalent and polyvalent cations in the form of sulfate. The purpose of this approach is that if traces (in the ppb range) of the precipitation solvent remain in the treated water, the treated water will be reused strictly for mining purposes, which is the practice of the "Pinal Creek Group" since the remedial pumping of contaminated water started in 1990.

If the purpose of treating contaminated waters, however, is to meet drinking water standards, then the second approach is to use the MD-precipitation process to treat the contaminated water. The treated water can then be discharged to surface water. FIG. 3 depicts a single-stage MD-precipitation process. Table 3 indicates that the concentrations of inorganic materials in ground and surface waters are suitable for direct application of MD. The MD step [10–22] will serve to produce an ultra-pure permeate stream. The MD concentrate stream [22] will be first recycled to the MD feed stream. As the concentration of toxic metals and other inorganic materials increases in the MD concentrate stream due to continuous evaporation, the precipitation process [24–38] will then take place (precipitation step by organic solvents, VMD step to recover organic solvents, and the filtration-clarification step to remove precipitates) to treat the MD concentrate stream. The purpose of the precipitation stage is to serve as an enabling post-treatment for the MD step to effectively remove the concentrated toxic metals and without interfering with the treated water. If needed, a second-stage MD [40–54] as shown in FIG. 4 can be used as a polishing step to completely purify the overflow stream [40] that will result from the filtration units (MF and HC).

These two processing approaches can be equally applied to other mining sites that not only affected by toxic transition metals, but also affected by radioactive rare earth elements.

TABLE 1

Concentration Profiles for Some Offshore Produced Waters and Seawater.

| | Concentration (ppm) | | |
|---|---|---|---|
| Species | Well A8 | Well A27 | Seawater |
| Cations | | | |
| Na | 29,210 | 35,220 | 11,200 |
| K | 1,240 | 1,490 | 370 |
| Mg | 68 | 77 | 1,400 |
| Ca | 350 | 705 | 400 |
| Sr | 67 | 145 | N.A. |
| Ba | 780 | 1,610 | N.A. |
| Anions | | | |
| Cl | 46,800 | 58,680 | 19,750 |
| $HCO_3$ | 3,090 | 1,620 | 140 |

TABLE 1-continued

Concentration Profiles for Some Offshore Produced Waters and Seawater.

| | Concentration (ppm) | | |
|---|---|---|---|
| Species | Well A8 | Well A27 | Seawater |
| $SO_4$ | 10 | 14 | 2,650 |
| $\pi$ (psia) | 1,012 | 1,292 | 410 |

Well A08 and Well A27 are offshore produced waters (South Bare Formation, North Sea)
$\pi$ is the osmotic pressure at 25° C. (Calculated based on the concentrations of NaCl)

TABLE 2

Concentration Profiles for Some Brine Waters (Wells 2E, 4E, 10E, and 12E) and Deep Formation Water (Injection Well) at the Paradox Valley, Colorado.

| | Concentration (ppm) | | | | |
|---|---|---|---|---|---|
| Species | Well 2E | Well 4E | Well 10E | Well 12E | Injection Well |
| Cations | | | | | |
| Na | 91,700.00 | 88,500.00 | 85,100.00 | 89,900.00 | 52,400.00 |
| K | 4,200.00 | 4,200.00 | 4,270.00 | 4,470.00 | 1,750.00 |
| Mg | 1,480.00 | 1,500.00 | 1,560.00 | 1,520.00 | 900.00 |
| Ca | 1,390.00 | 1,380.00 | 1,260.00 | 1,330.00 | 7,900.00 |
| Sr | 26.10 | 26.40 | 24.60 | 25.60 | 308.00 |
| Ba | 0.12 | 0.07 | 0.07 | 0.05 | 5.52 |
| Anions | | | | | |
| Cl | 150,000.00 | 148,000.00 | 145,000.00 | 147,000.00 | 99,600.00 |
| Br | 85.90 | 83.70 | 83.70 | 86.20 | 187.00 |
| $HCO_3$ | 313.00 | 295.00 | 226.00 | 258.00 | 273.00 |
| $SO_4$ | 5,940.00 | 5,920.00 | 5,860.00 | 5,920.00 | 726.00 |
| $SiO_2$ | 7.60 | 8.60 | 5.60 | 6.00 | 69.70 |
| $\pi$ (psia) | 3,837 | 3,773 | 3,677 | 3,741 | 2,339 |

Wells 2E, 4E, 10E, and 12E are brine waters with high sulfate concentrations
The Injection well contains formation water with high calcium concentrations.

TABLE 3

Concentration Profiles of Groundwater (Wells 51, 302, 503, and 702) and Surface Water (ID: Inspiration Dam) at the Pinal Creek Basin, Arizona

| | Concentration (ppm) | | | | |
|---|---|---|---|---|---|
| Species | Well 51 | Well 302 | Well 503 | Well 702 | ID |
| Cations | | | | | |
| Na | 77.000 | 66.000 | 62.000 | 57.000 | 63.000 |
| K | 8.200 | 4.400 | 5.300 | 3.900 | 6.400 |
| Mg | 97.000 | 38.000 | 110.000 | 88.000 | 90.000 |
| Ca | 300.000 | 210.000 | 460.000 | 470.000 | 390.000 |
| Sr | 1.300 | 0.800 | 1.500 | 1.400 | 1.400 |
| Mn | 13.000 | 7.100 | 75.000 | 1.100 | 45.500 |
| Fe | 200.000 | 140.000 | 0.026 | 0.009 | 0.130 |
| Co | — | — | 0.870 | 0.014 | 0.210 |
| Ni | 0.450 | 0.240 | 0.800 | 0.030 | 0.490 |
| Cu | 24.000 | 11.000 | 0.670 | 0.030 | 0.030 |
| Zn | 2.900 | 1.500 | 1.900 | 0.009 | 0.350 |
| Cd | 0.069 | 0.049 | 0.022 | 0.003 | 0.007 |
| Al | 28.100 | 13.700 | 2.610 | 0.005 | 0.250 |
| Anions | | | | | |
| F | 7.600 | 3.400 | 2.900 | 0.400 | 3.100 |
| Cl | 41.000 | 45.000 | 49.000 | 48.000 | 47.000 |
| $SO_4$ | 1900.000 | 1200.000 | 1800.000 | 1200.000 | 1500.000 |
| Alkalinity ($CO_3$) | — | — | 27.000 | 165.000 | 90.000 |
| Silica ($SiO_2$) | 88.000 | 75.000 | 67.000 | 43.000 | 30.000 |
| pH | 3.9 | 4.0 | 5.3 | 6.9 | 7.8 |

What is claimed is:

1. A method of producing petroleum, gas, or other products from a subterranean formation using seawater, said method comprising the steps of:
   (a) removing natural sulfate from said seawater by
      (i) concentrating said seawater by membrane distillation to produce an intermediate concentrate comprising at least calcium sulfate, said calcium sulfate having an increased concentration in said intermediate concentrate;
      (ii) adding organic solvent to said intermediate concentrate in an amount effective to form a precipitate comprising said sulfate, said organic solvent having an increased relative volatility in said intermediate concentrate in the presence of said sulfate;
      (iii) removing at least most of said organic solvent from said intermediate concentrate by vacuum membrane distillation;
      (iv) after step (iii), removing said precipitate from said intermediate concentrate to produce a treated seawater product having at least most of said sulfate removed therefrom; and
   (b) injecting said treated seawater product into said subterranean formation.

2. The method of claim 1 wherein said organic solvent is added in step (a) in an amount effective to precipitate most of said sulfate from said seawater.

3. The method of claim 1 wherein said organic solvent is isopropylamine, ethylamine, or a combination thereof.

4. A method of producing petroleum, gas, or other products from a subterranean formation using formation-produced water, said method comprising the steps of:
 (a) removing natural, inorganic material from said formation-produced water by
  (i) adding organic solvent to said formation-produced water in an amount effective to form a precipitate comprising at least a portion of said inorganic material, said organic solvent having an increased relative volatility in said formation produced water in the presence of said inorganic material;
  (ii) removing at least most of said organic solvent from said formation-produced water by vacuum membrane distillation;
  (iii) after step (ii), removing at least a portion of said precipitate from said formation-produced water to yield a treated formation water product; and
 (b) injecting said treated formation water product into said subterranean formation.

5. The method of claim 4 wherein said natural, inorganic material comprises at least one of sulfate, calcium, barium, strontium, radium, Naturally Occurring Radioactive Material, silica, silicate, or a combination thereof.

6. The method of claim 4 wherein said organic solvent is isopropylamine, ethylamine, or a combination thereof.

7. A method of producing petroleum, gas, or other products from a subterranean formation using seawater, said method comprising the steps of:
 (a) removing natural sulfate from said seawater by
  (i) concentrating said seawater by membrane distillation to produce an intermediate concentrate comprising at least calcium sulfate, said calcium sulfate having an increased concentration in said intermediate concentrate.
  (ii) adding organic solvent to said intermediate concentrate in an amount effective to form a precipitate comprising said sulfate, said organic solvent having an increased relative volatility in said intermediate concentrate in the presence of said sulfate;
  (iii) removing at least most of said organic solvent from said intermediate concentrate by vacuum membrane distillation;
  (iv) after step (iii), removing said precipitate from said intermediate concentrate to produce a treated seawater product having at least most of said sulfate removed therefrom; and
 (b) removing natural, inorganic material from said formation-produced water by
  (i) adding organic solvent to said formation-produced water in an amount effective to form a precipitate comprising at least a portion of said inorganic material, said organic solvent having an increased relative volatility in said formation produced water in the presence of said inorganic material;
  (ii) removing at least most of said organic solvent from said formation-produced water by vacuum membrane distillation;
  (iii) after step (ii), removing at least a portion of said precipitate from said formation-produced water to yield a treated formation water product; and
 (c) after steps (a) and (b), blending said treated seawater with said treated formation water to produce scale-free saline water. and
 (d) injecting said scale-free saline water product into said subterranean formation.

8. The method of claim 7 wherein said organic solvent is isopropylamine, ethylamine, or a combination thereof.

9. The method of claim 7 wherein said organic solvent is added in step (a) in an amount effective to precipitate substantially most of said sulfate from said seawater.

10. The method of claim 7 wherein said organic solvent is added in step (b) in an amount effective to precipitate most of said natural inorganic material from said formation produced water, wherein said natural inorganic material comprises at least one of calcium, barium, strontium, radium, Naturally Occurring Radioactive Material, silica, and silicate.

11. A method of treating an aqueous stream having inorganic material dissolved therein at a concentration sufficiently low for direct treatment of said aqueous stream by membrane distillation, said method comprising the steps of:
 (a) distilling said aqueous stream by membrane distillation to produce an aqueous permeate product and an intermediate concentrate comprising at least most of said inorganic material;
 (b) adding organic solvent to said intermediate concentrate in an amount effective to form a precipitate comprising at least a portion of said inorganic material, said organic solvent having an increased relative volatility in said intermediate concentrate in the presence of said inorganic material;
 (c) removing at least most of said organic solvent from said intermediate concentrate by vacuum membrane distillation; and
 (d) after step (c), removing at least most of said precipitate from said intermediate concentrate to produce a concentrate product and a purified aqueous product,
  wherein said inorganic material is a member of the group consisting of aluminum, titanium, vanadium, chromium, manganese, iron, cobalt, nickel, cadmium, zinc, zirconium, cerium, praseodymium, neodymium, promethium, samarium, europium, gadolinium, terbium, dysprosium, holmium, erbium, thulium, ytterbium, lutetium, thorium, uranium, silicate, silica, fluoride, chloride, sulfate, nitrate, phosphate, and combinations thereof and
  said organic solvent is selected from the group consisting of isopropylamine, ethylamine, propylamine, diisopropylamine, diethylamine, dimethylamine, and combinations thereof.

* * * * *